United States Patent
Smith et al.

(10) Patent No.: US 9,864,592 B2
(45) Date of Patent: *Jan. 9, 2018

(54) SYSTEM AND METHOD FOR DEPLOYING SOFTWARE INTO A COMPUTING ENVIRONMENT

(71) Applicant: EntIT Software LLC, Sunnyvale, CA (US)

(72) Inventors: Rick Smith, Ft. Collins, CO (US); Robert Lovejoy Raymond, Ft. Collins, CO (US); Craig W. Bryant, Ft. Collins, CO (US); Chris Schleicher, Ft. Collins, CO (US)

(73) Assignee: EntIT Software LLC, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,444

(22) Filed: Sep. 25, 2015

(65) Prior Publication Data

US 2016/0019041 A1    Jan. 21, 2016

Related U.S. Application Data

(63) Continuation of application No. 12/533,660, filed on Jul. 31, 2009, now Pat. No. 9,182,964.

(51) Int. Cl.
*G06F 9/445* (2006.01)
*H04L 29/08* (2006.01)

(52) U.S. Cl.
CPC ............ *G06F 8/61* (2013.01); *H04L 67/34* (2013.01)

(58) Field of Classification Search
CPC ................................ H04L 67/34; G06F 8/61

USPC .......................................................... 717/177
See application file for complete search history.

(56) References Cited

U.S. PATENT DOCUMENTS

| | | |
|---|---|---|
| 6,065,051 A | 5/2000 | Steele |
| 6,141,793 A | 10/2000 | Bryant |
| 6,175,363 B1 | 1/2001 | Willaims |
| 6,211,877 B1 | 4/2001 | Steele |
| 6,253,325 B1 | 6/2001 | Steele |
| 6,282,175 B1 | 8/2001 | Steele |
| 6,314,458 B1 | 11/2001 | Steele |
| 6,344,862 B1 | 2/2002 | Williams |
| 6,405,367 B1 | 6/2002 | Bryant |
| 6,594,786 B1 | 7/2003 | Connelly |
| 6,842,833 B1 | 1/2005 | Phillips |
| 6,968,535 B2 | 11/2005 | Stelting |
| 7,010,593 B2 | 3/2006 | Raymond |
| 7,127,455 B2 | 10/2006 | Carson |
| 7,478,361 B2 * | 1/2009 | Peteanu .................. G06F 8/61  709/226 |
| 7,483,384 B2 | 1/2009 | Bryant |

(Continued)

FOREIGN PATENT DOCUMENTS

EP    1577765    9/2005

*Primary Examiner* — John Chavis

(57) ABSTRACT

There is provided a system, method, and machine readable medium to deploying software into a computing environment by a processor. A model of the environment into which a model of software is to be deployed is provided. A plan for deploying the software into the computing environment is provided where the plan matches elements of the software to characteristics of the computing environment. The software is deployed into the computing environment according to the customized deployment plan.

17 Claims, 14 Drawing Sheets

(56) References Cited

U.S. PATENT DOCUMENTS

| | | | |
|---|---|---|---|
| 7,490,073 B1 | 2/2009 | Qureshi et al. | |
| 7,730,482 B2 | 6/2010 | Illowsky et al. | |
| 7,870,550 B1 | 1/2011 | Qureshi et al. | |
| 7,945,768 B2* | 5/2011 | Essick, IV | G06F 9/325 712/241 |
| 7,966,814 B2 | 6/2011 | Buis et al. | |
| 7,996,814 B1* | 8/2011 | Qureshi | G06N 5/048 717/100 |
| 8,176,465 B2 | 5/2012 | Dutta et al. | |
| 8,281,307 B2 | 10/2012 | Arnold et al. | |
| 2002/0049883 A1 | 4/2002 | Schneider et al. | |
| 2005/0204354 A1 | 9/2005 | Sundararajan | |
| 2005/0223046 A1 | 10/2005 | Smith | |
| 2006/0095858 A1 | 5/2006 | Hao | |
| 2006/0114838 A1 | 6/2006 | Mandavilli | |
| 2006/0123414 A1 | 6/2006 | Fors et al. | |
| 2006/0224689 A1 | 10/2006 | Leip et al. | |
| 2008/0040455 A1 | 2/2008 | MacLeod | |
| 2008/0183715 A1 | 7/2008 | Chen | |
| 2009/0144515 A1 | 6/2009 | Benari | |
| 2009/0249284 A1* | 10/2009 | Antosz | G06F 8/10 717/104 |
| 2009/0320019 A1 | 12/2009 | Ellington et al. | |
| 2010/0223287 A1 | 9/2010 | Lim | |
| 2010/0281456 A1 | 11/2010 | Eizenman et al. | |
| 2011/0029963 A1* | 2/2011 | Smith | H04L 67/34 717/171 |
| 2012/0167072 A1 | 6/2012 | Boykin et al. | |
| 2012/0297247 A1 | 11/2012 | Aronovich et al. | |
| 2012/0303592 A1 | 11/2012 | Aronovich et al. | |
| 2012/0304174 A1 | 11/2012 | Arnold et al. | |
| 2015/0341230 A1* | 11/2015 | Dave | H04L 41/5058 705/7.29 |
| 2015/0378700 A1* | 12/2015 | Rachamadugu | G06F 8/70 717/120 |
| 2016/0019096 A1* | 1/2016 | Winterfeldt | G06F 8/60 717/177 |
| 2016/0112262 A1* | 4/2016 | Johnson | G06F 9/45504 709/221 |

* cited by examiner

200

300

400

700

900

1000

1400

SYSTEM AND METHOD FOR DEPLOYING SOFTWARE INTO A COMPUTING ENVIRONMENT

CROSS-REFERENCE TO RELATED APPLICATIONS

This application is a continuation of U.S. patent Ser. No. 12/533660, filed Jul. 31, 2009, now U.S. Pat. No. 9,182,964, entitled "System and Method For Deploying Software Into A Computing Environment", which is hereby incorporated by reference herein in its entirety.

BACKGROUND

A production computing environment such as a data center may include numerous individual computer systems and servers, each with various hardware and software characteristics. The computers and servers may be arranged in a wide array of network configurations depending on the needs of the particular production environment. Computers and servers in production environments may run customized software applications to accomplish specific purposes.

Deploying application software in a complex computing environment can cause errors that result in reduced performance and lost revenue. One cause of errors in application deployment is the use of different processes for deployment into a testing environment versus deployment into production. Differences between test and production operating environments can also result in errors during application deployment. For example, computers in a test environment may have different operating system patch levels or middleware versions relative to production environment systems.

BRIEF DESCRIPTION OF THE DRAWINGS

Certain exemplary embodiments are described in the following detailed description and in reference to the drawings, in which.

DETAILED DESCRIPTION OF THE PREFERRED EMBODIMENTS

An exemplary embodiment of the present invention relates to a system and method for upgrading computer systems.

As fully set forth below, a development team may create components that need to be run on various tiers of a multi-tier application. One example of a component type is a code component. A code component may comprise executable files, graphic assets, and/or markup assets. Code may be harvested from local and/or remote file systems, source code control systems, URLs or the like. Appropriate scripts or artifacts must be run against the correct machines in a deployment topology.

When deployment is done in a production environment, it may not be known whether system attributes such as underlying operating systems and middleware are the same relative to a testing environment used to develop the scripts or artifacts. Exemplary embodiments of the present invention relate to an automated software deployment system and method that reduces errors in production by providing improved consistency with respect to process and operating environments across multiple phases of a software development lifecycle.

Those of ordinary skill in the art will appreciate that the various functional blocks shown in the accompanying figures may comprise hardware elements (including circuitry), software elements (including computer code stored on a machine-readable medium) or a combination of both hardware and software elements. Moreover, the arrangements of functional blocks shown in the figures are merely examples of functional blocks that may be implemented according to an exemplary embodiment of the present invention. Other arrangements of functional blocks may readily be determined by those of ordinary skill in the art based on individual system design considerations.

Figure 1:
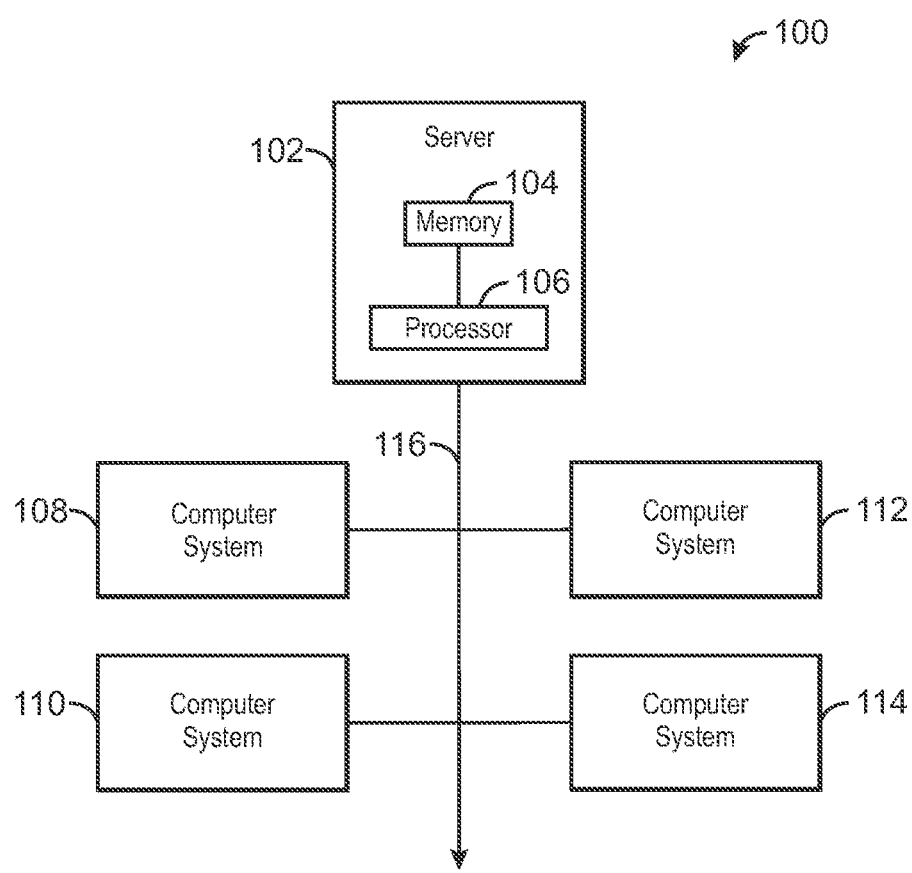
FIG. 1 is a block diagram of a computer network according to an exemplary embodiment of the present invention.

FIG. 1 is a block diagram of a computer network according to an exemplary embodiment of the present invention. The computer network is generally referred to by the reference number 100. The computer network 100 may comprise a production computing environment. Those of ordinary skill in the art will appreciate that a computer network according to an exemplary embodiment of the present invention may be more complex than the computer network 100 shown in FIG. 1. Moreover, such a computer network may comprise sub-branches with additional devices, connections to an external network such as the Internet, and so on. Further, the computer system 100 could be, for example, a user or provider system, a datacenter, and so forth.

The computer network 100 includes a server 102, which comprises a memory 104. The memory 104 may include a volatile portion and/or a non-volatile portion. Moreover, the memory 104 represents a tangible, machine-readable medium that stores computer instructions for execution by a system processor 106. The processor 106 may execute the instructions to perform a method according to an exemplary embodiment of the present invention.

In addition, the computer network 100 comprises a plurality of computer systems 108, 110, 112 and 114, which may be servers, desk top computer systems notebook computer systems or the like. The plurality of computer systems 108, 110, 112 and 114 are connected to the server 102 by a network infrastructure 116. The network infrastructure 116 may comprise routers, switches hubs or the like.

The server 102 and the plurality of computer systems 108, 110, 112 and 114 may execute software applications to facilitate a wide range of purposes. For example, the server 102 and the plurality of computer systems 108, 110, 112 and 114 may operate to perform a particular function such as hosting a business web site. The plurality of computer systems 108, 110, 112 and 114 may each perform a different function to facilitate the hosting of the website. In particular, each of the plurality of computer systems 108, 110, 112 and 114 may run one or more software components that serve different functions (for example, hosting a database, creating web page frameworks, populating certain fields on a page, performing a credit card validation or the like). The computer systems that run these components are intended to contain the appropriate operating environment, including an operating system and appropriate middleware (for example, application server software, web server software, database management software). The components may need to be configured with the correct data for the particular operating environment in which they reside. Examples of configuration data include host names and port numbers of the related components.

Exemplary embodiments of an automated software development tool according to the present invention allow network managers and service personnel who support an application lifecycle for the computer network 100 to track all of the components, configuration information, devices, operating environments and all of the inter-relationships between them. Moreover, an exemplary embodiment of the present invention provides a software application that eliminates the need to manually track such information.

In general, software application development proceeds through a development lifecycle. Phases of the development lifecycle correspond to different target devices that are used to run the application. Sets of target devices that comprise the pool of available resources for a lifecycle phase may be referred to as an environment.

The development lifecycle typically begins with a development phase in which the software is created. The development phase is followed by one or more testing phases, which may focus on unit, functional, integration and performance testing.

Applications are created in units that may be referred to as releases. A release has a particular set of functionality that is to be delivered together. Multiple releases of an application may be in development at the same time. Different releases of an application may have different lifecycles associated with them. For example, a major new set of functionality may require a multi-stage testing cycle, whereas a fix to an urgent production issue may require a much shorter lifecycle to insure the critical issue if fixed as quickly as possible. Typically, the first set of code produced by development is not of sufficient quality to be deployed into production. Therefore, many iterations of code must pass between development and testing prior to a finalized version being ready for production. These iterations are called versions of the release.

After a release of an application is deemed sufficiently complete, it is moved to the production phase where it is put into general use. According to an exemplary embodiment of the present invention, a consistent automated process is used during all phases of the development lifecycle to improve quality and reduce development-to-production (end-to-end) deployment time in a production computing environment.

In addition, complex software programs may include multiple tiers. Such software is typically referred to as n-tier software applications. This reflects the fact that applications are composed of many different components, each of which must be run on a target device (physical or virtual) that contains an appropriate operating system and collection of middleware. For an application to function correctly, the operating system and middleware must be of a specific version and patch level. In addition, the components are desirably deployed to the appropriate tiers, and the relationships between the tiers are defined correctly.

To further refine the terminology of application development, applications may have one or more releases, each of which has one or more versions. A version is essentially a snapshot of a release at a particular time. Versions and releases include one or more tiers.

In one exemplary embodiment of the present invention, an operating environment (for example, quality assurance, pre-production, production or the like) contains many target devices. The target devices may be physical or virtual machines. Each of the target devices contains software that allows the target device to perform the function of one or more tiers. Examples of this software include web server software, database software or the like. These machines may then be grouped together into a pod of machines containing the appropriate tiers necessary to run certain types of applications (3-tier for example). Software may be deployed, for example, in the form of components, onto tiers within a pod.

Pods reside within a particular operating environment. Therefore, an operating environment may be described as comprising one or more pods. Each pod, in turn, may comprise one or more tiers. Each tier may comprise one or more target devices. Both the software application and the operating environment decompositions contain a tier element. Thus, the tier provides a coordination point thorough which operations can be designated for an application. By inference, the appropriate infrastructure in the environment can be affected. For example, a software developer may create a new component that is required for an application, and add it to the appropriate tier in the application.

According to an exemplary embodiment of the present invention, the new component may be automatically deployed to the appropriate infrastructure without the software developer collecting information about that operating environment. Similarly, a new availability or performance monitor could be created for an application component (for example, a web service). By inference, the application component may be automatically configured to monitor all corresponding target devices in the operating environment.

According to an exemplary embodiment of the present invention, deployments may desirably occur in a particular order. For example, the server 102 may need to be placed into a particular state prior to deploying new software to it. Deployment ordering is desirably capable of being interleaved across multiple tiers of an application.

Furthermore, a software deployment tool according to an exemplary embodiment of the present invention may account for the fact that problems may occur during deployment to an environment. A failure to deploy to one tier of an application (perhaps due to a hardware failure during deployment) may require that all other tiers be rolled back to their previous state. Accordingly, an automated software deployment tool according to an exemplary embodiment of the present invention may comprise a rollback mechanism that crosses multiple tiers of an application.

Figure 2:
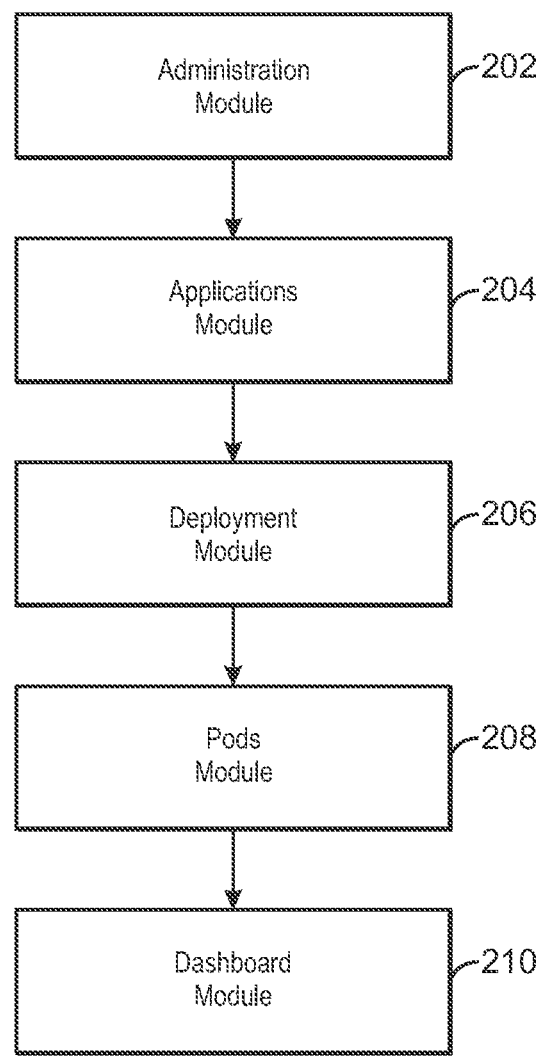
FIG. 2 is a block diagram showing a software deployment application according to an exemplary embodiment of the present invention.

FIG. 2 is a block diagram showing an automated software deployment application according to an exemplary embodiment of the present invention. The automated software deployment application is generally referred to by the reference number 200. The automated software deployment application 200 may be used to deploy software such as applications, patches, bug fixes or the like into a computer network such as the computer network 100 (FIG. 1).

The automated software deployment tool 200 comprises an administration module 202. Functionality provided by the administration module 202, which may be accessed by an administration menu (described below), allows a user to administer the overall operation of the automated software deployment tool 200.

An applications module 204 allows the user to monitor the status of new software applications as they are developed. Functionality provided by the applications module 204 may be accessed via an applications menu, as described below.

A deployment module 206 allows the user to initiate the deployment of software into a computer network. Functionality provided by the deployment module 206 may be accessed via a deployment menu, as described below.

A pods module 208 allows a user to define pods of hardware into which software is to be deployed. Functionality provided by the pods module 208 may be accessed via a pods menu, as described below.

Finally, a dashboard module 210 allows a user to get overall status information about a managed network of computer systems. Functionality provided by the dashboard module 210 may be accessed via a dashboard menu, as described below.

The modules of the automated software deployment tool 200 allow a user to model an application prior to deployment. Application editing may be permissioned to allow increased security. Examples of attributes of an application that may be modeled include the data that is to be deployed, any scripts that need to be run as part of a deployment, and any custom workflows that should be run during a deployment. In addition, configuration files that must be created or modified as part of the deployment may be modeled. Application modeling according to an exemplary embodiment of the present invention may include the correct ordering of the modeled attributes within a tier and across multiple tiers. Additionally, the definition of any parameters which must be set when the deployment is executed may be modeled.

According to an exemplary embodiment of the present invention, application modeling does not differ depending on the environment into which the application is to be deployed. Moreover, the application modeling process takes into account features that are unique to the application or other software that is to be deployed. Application modeling, however, may allow the environment into which the deployment is occurring to be passed as a parameter into a component. Thus, a script that includes logic to do something different depending on whether it is being deployed into a QA environment or a production environment could be created and modeled.

In addition to modeling an application to be deployed, the environment into which the application is to be deployed is also modeled. According to an exemplary embodiment of the present invention, modeling of an environment takes into account workflows that may be performed before and after a deployment, along with permissions that specify who may deploy software into the environment. Pods may be added or deleted from environments. Tiers may be added, modified or deleted from pods. Devices such as computer systems or servers may be added to or deleted from tiers within a pod.

After the modeling of the application and the modeling of the environment is completed, the deployment of the application into the environment may then be customized. According to an exemplary embodiment of the present invention, aspects of a deployment that may be customized include the modification of deployment parameter values. For example, different administrator usernames and/or passwords needed for certain deployment operations may be provided for different environments. In addition, a future start time for a deployment may be set.

In addition, customization of the timing of different parts of a deployment may be performed. For example, an application deployment may be planned for 2,000 different sites. Such a deployment may be done for a retail chain where each individual store has its own network of systems. Simply copying the code to deploy to all those machines could take many days. Instead, the deployment may be customized by copying files into a temporary location on all the target devices on a Monday night. The actual deployment may be delayed until Friday night, at which time the files are moved from their temporary location into their destination. In this manner, all locations may be updated at the same time.

After customization of the deployment, the deployment is actually executed in the environment.

Figure 3:
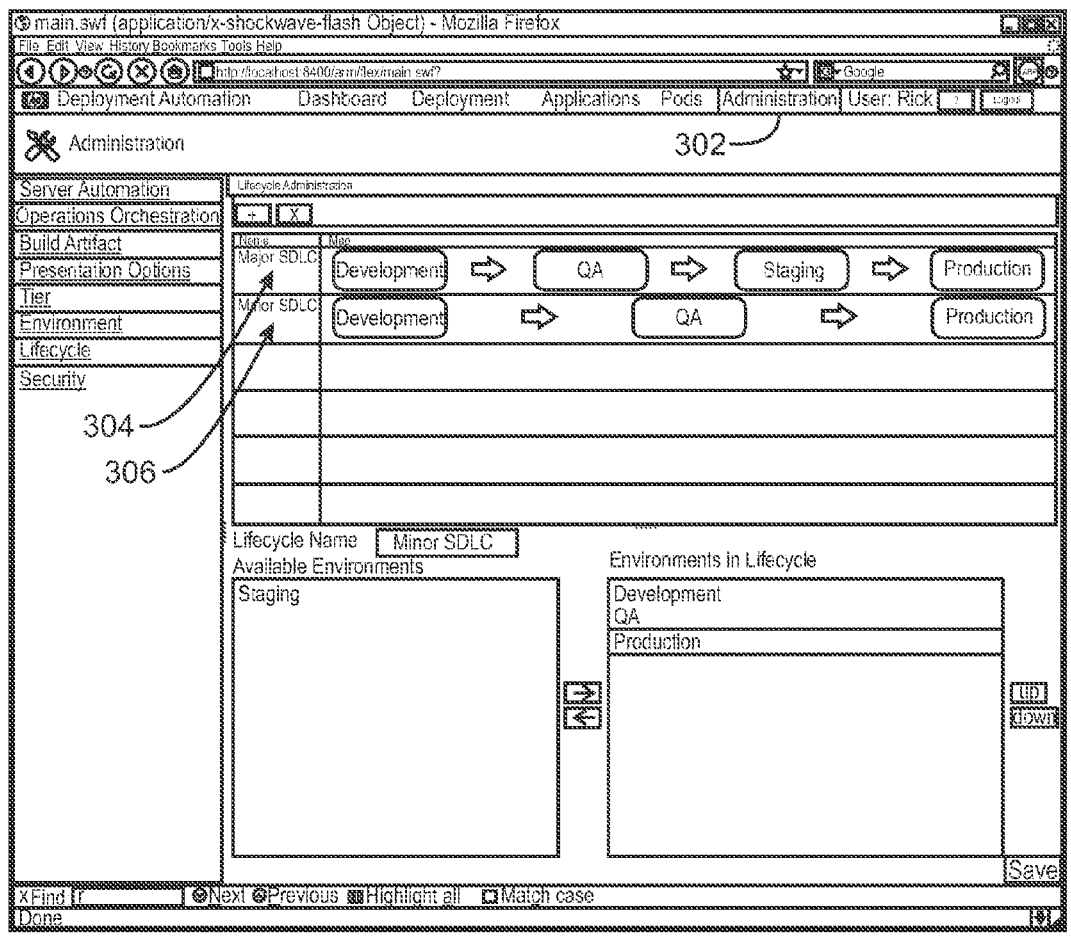
FIG. 3 is a diagram showing an administration menu of a software deployment application according to an exemplary embodiment of the present invention.

FIG. 3 is a diagram showing an administration menu of a software deployment tool according to an exemplary embodiment of the present invention. The administration menu is generally referred to by the reference number 300. The administration menu 300 includes an administration menu tab 302, which may be selected to display the administration menu screen of a software deployment tool according to an exemplary embodiment of the present invention.

As shown in FIG. 3, a software development lifecycle may comprise multiple parallel environments, each containing target devices to which software can be deployed. The administration screen shown in FIG. 3 includes a first lifecycle 304 and a second lifecycle 306. Each of the lifecycles 304 and 306 contain a plurality of environments. Specifically, the first lifecycle 304 contains a development environment, a QA environment, a staging environment and a production environment. The second lifecycle 306 contains a development environment, a QA environment and a production environment. Each of the environments shown in FIG. 3 represents one or more pods, which contain tiers. The pods may comprise one or more corresponding computer systems (such as the computer systems 108, 110, 112 and 114 (FIG. 1)) in an operating network.

For a given software deployment, the target devices in a corresponding pod contain the operating system and middleware necessary to allow them to perform as a specified tier. Moreover, the tiers necessary to run a particular application are grouped together to form the pods shown in FIG. 3. A pod is the finest level of granularity for deployment of software. Accordingly, an exemplary embodiment of the present invention allows software applications to be deployed on a per pod basis. Exemplary embodiments of the present invention may also provide deployment to multiple pods at the same time. The tiers contained in the pod are desirably a match or superset of those in the application. The components defined in each tier of the application may be automatically deployed to the target devices contained by the tier definition in the pod within the environment. An exemplary embodiment of the present invention may prevent a user from attempting to deploy software to a pod that does not contain the correct tiers for the software that is being deployed.

Furthermore, a definition of an operating environment for each tier may be used to ensure that each target device in each tier of the pod in each environment of the lifecycle is uniform. The operating environment definition includes the operating system and middleware required for the tier. Moreover, automated deployment according to an exemplary embodiment of the present invention may ensure that the target device has the correct operating system and middleware prior to deploying the application.

The administration screen shown in FIG. 3 may be used to add new environments to which software may be deployed. Each environment may be created with associated permissions to allow deployment of software only by authorized personnel.

Figure 4:
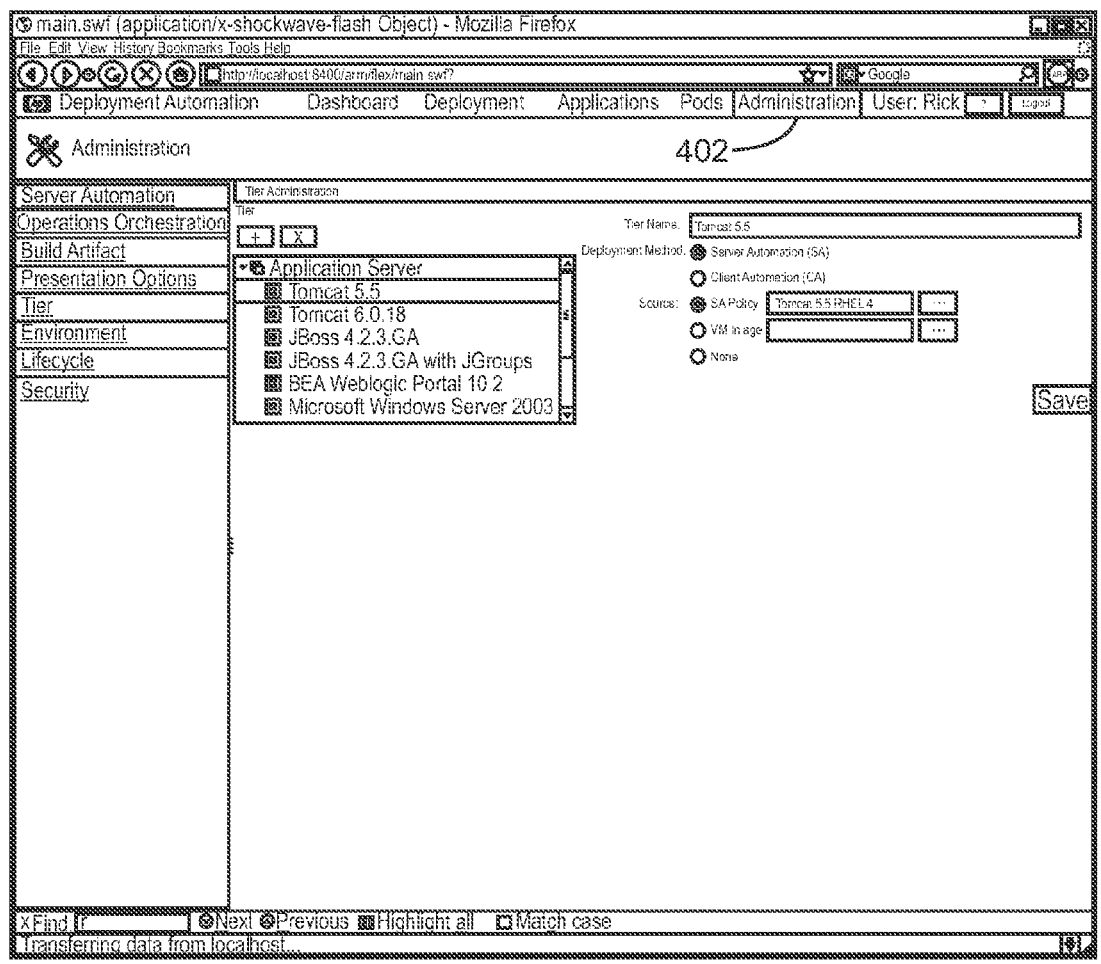
FIG. 4 is a diagram showing a tier administration submenu of an administration menu of a software deployment application according to an exemplary embodiment of the present invention.

FIG. 4 is a diagram showing a tier administration submenu of the administration menu of a software deployment application according to an exemplary embodiment of the present invention. The tier administration submenu is generally referred to by the reference number 400. The tier administration submenu 400 may be selected when an administration menu tab 402 is active. In an exemplary embodiment of the present invention, the tier administration submenu 400 may be used to associate information that ensures that appropriate OS and middleware components are installed on each system prior to deployment of a new software application.

Figure 5:
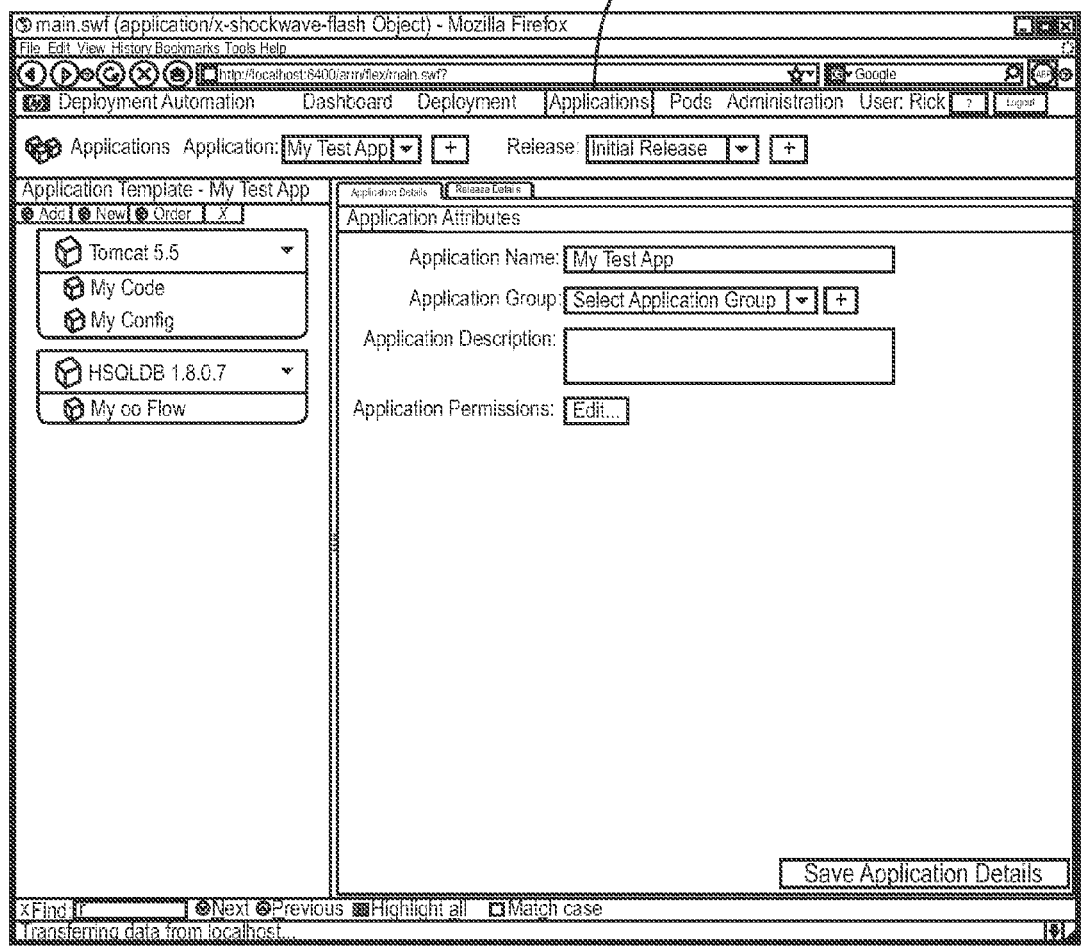
FIG. 5 is a diagram showing an applications menu of a software deployment application according to an exemplary embodiment of the present invention.

FIG. 5 is a diagram showing an applications menu of a software deployment application according to an exemplary embodiment of the present invention. The applications menu is generally referred to by the reference number 500. The applications menu 500 includes an applications menu tab 502, which may be selected to display the applications menu screen of a software deployment tool according to an exemplary embodiment of the present invention. The applications menu 500 may be used to display a status of applications as they are created. As described herein, each application may comprise one or more tiers, and each tier may comprise zero or more components. In addition, multiple releases may be created for each application.

Figure 6:
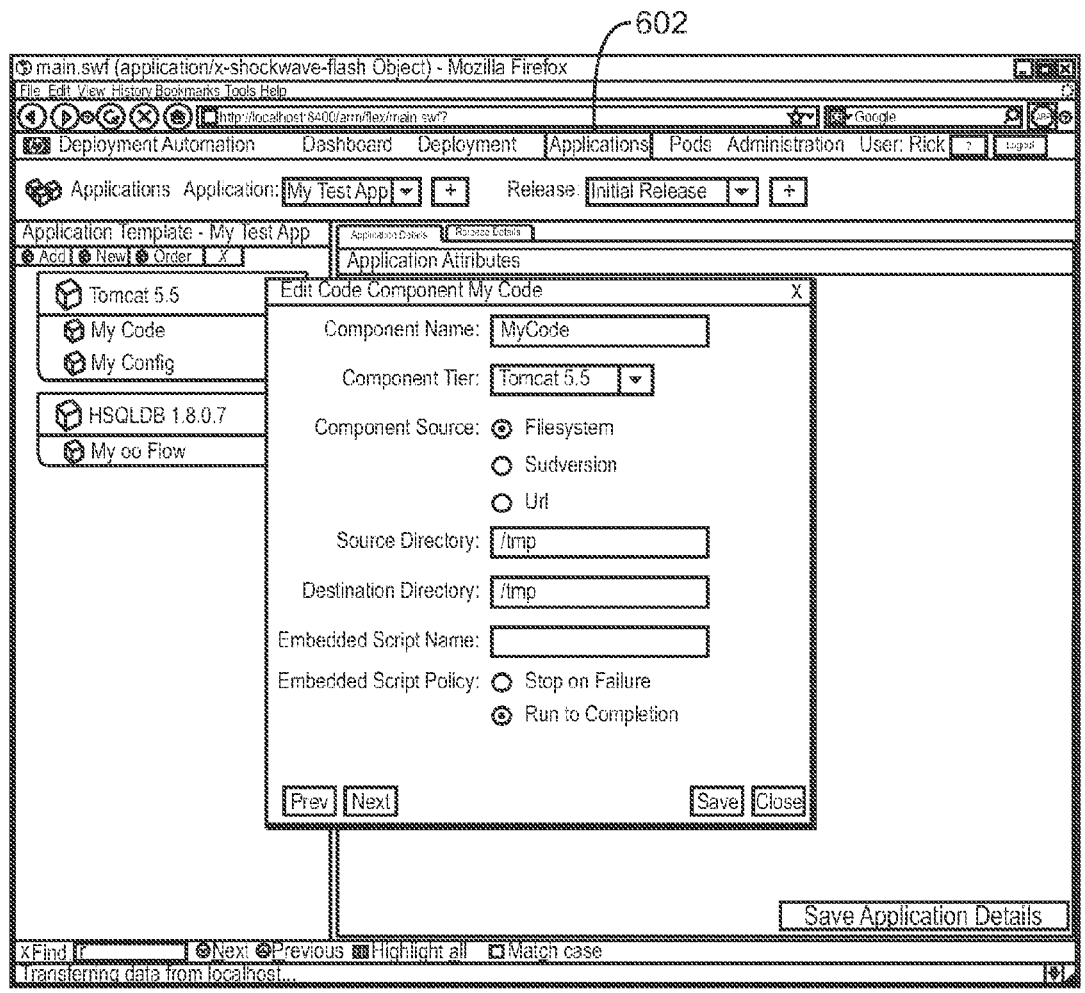
FIG. 6 is a diagram showing a code component editing submenu of an applications menu of a software deployment application according to an exemplary embodiment of the present invention.

FIG. 6 is a diagram showing a code component editing submenu of an applications menu of a software deployment application according to an exemplary embodiment of the present invention. The code component editing submenu is generally referred to by the reference number 600. The code component editing submenu 600 may be selected when an applications menu tab 602 is active. As shown in FIG. 6, the code component editing submenu 600 allows a user to edit properties of a code component such as a software component prior to deploying the code component according to an exemplary embodiment of the present invention.

Figure 7:
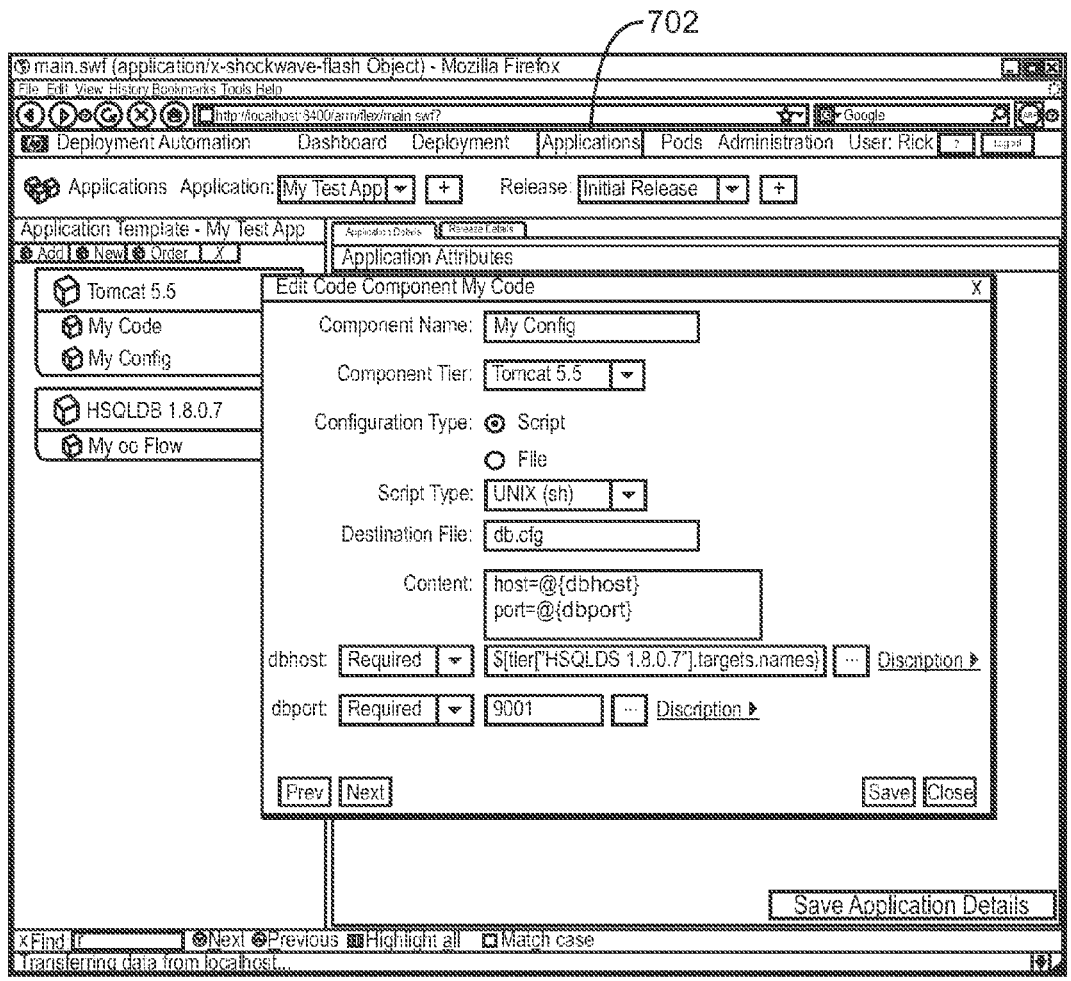
FIG. 7 is a diagram showing a configuration component editing submenu of an applications menu of a software deployment application according to an exemplary embodiment of the present invention.

FIG. 7 is a diagram showing a configuration component editing submenu of an applications menu of a software deployment application according to an exemplary embodiment of the present invention. The configuration component editing submenu is generally referred to by the reference number 700. The configuration component editing submenu 700 may be selected when an applications menu tab 702 is active.

In an exemplary embodiment of the present invention, a configuration component is used to create a configuration file. Configuration files may be used for a wide range of purposes, including linking different tiers of an application together. Other examples of functions that may be performed with configuration files include configuring middleware, specifying file locations, performing database configuration or the like. The exemplary configuration component editing submenu 700 shown in FIG. 7 shows a configuration component that creates a configuration file on an application server tier describing a host name and port number to access a database tier.

An exemplary embodiment of the present invention allows data to be filled in dynamically at deployment time. One exemplary embodiment of the present invention provides for automatic population of configuration information that connects multiple tiers of the application. In addition, abstraction between the definition of the application and assignment of target devices to the operating environment may be accomplished.

In FIG. 7, information regarding a dbhost parameter to a file is displayed. Moreover, parameter information such as the host name for the database tier may be provided. This information may only be determined once a particular pod is selected for a software deployment.

Figure 8:
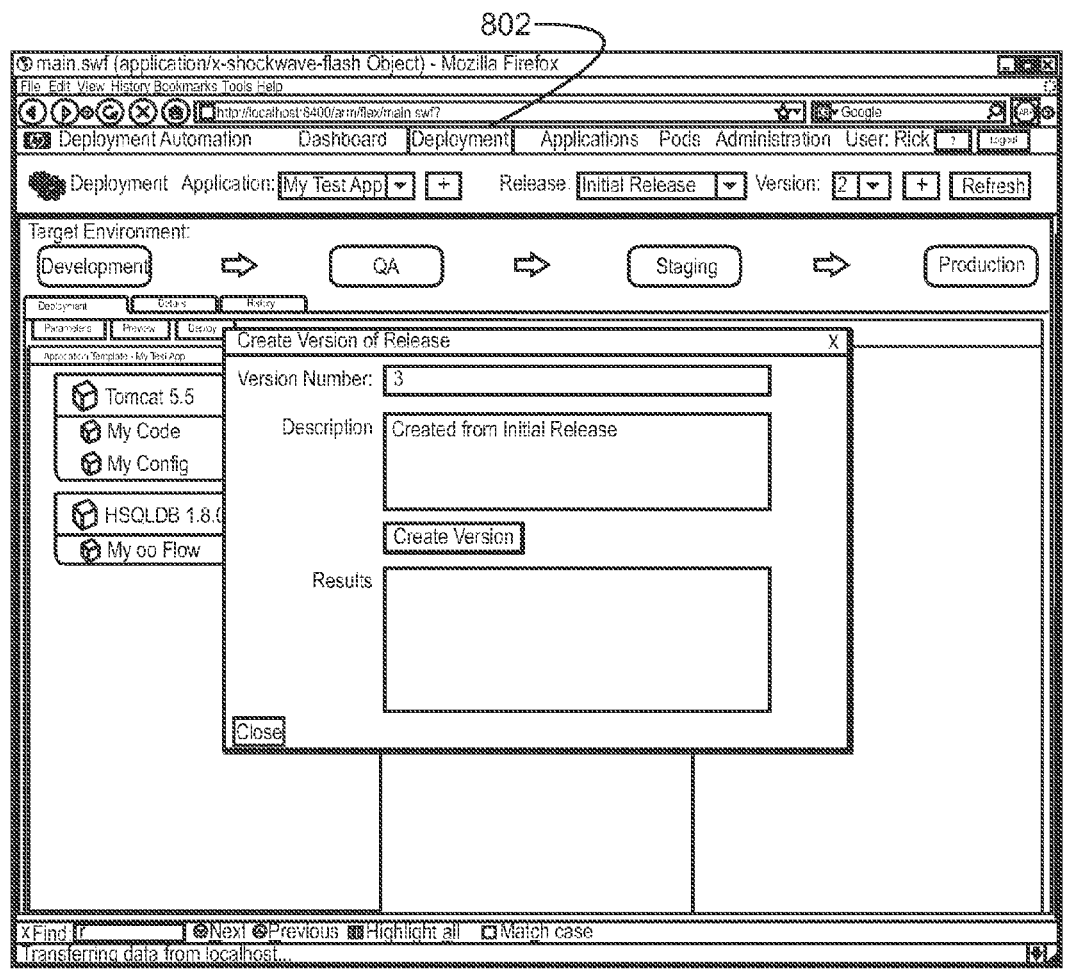
FIG. 8 is a diagram showing a deployment menu of a software deployment application according to an exemplary embodiment of the present invention.

FIG. 8 is a diagram showing a deployment menu of a software deployment application according to an exemplary embodiment of the present invention. The deployment menu is generally referred to by the reference number 800. The deployment menu 800 includes a deployment menu tab 802, which may be selected to display the deployment menu screen of a software deployment tool according to an exemplary embodiment of the present invention. As shown in FIG. 8, the deployment menu 800 may be used to display the status of new versions of applications that are being created. A new version may be created by harvesting the current state of components from, for example, a source code control system. Status information representing a state of this data gathering may be displayed.

Figure 9:
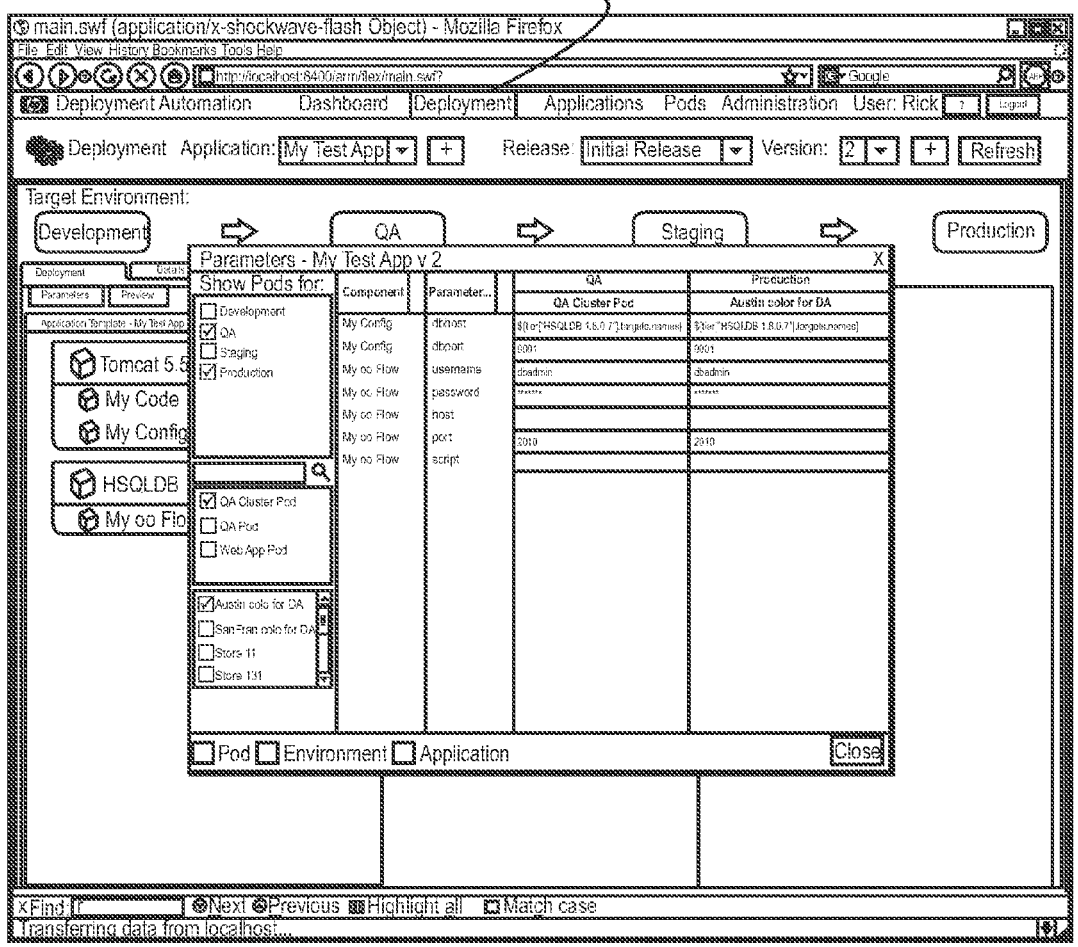
FIG. 9 is a diagram showing a configuration parameter editing submenu of a deployment menu of a software deployment application according to an exemplary embodiment of the present invention.

FIG. 9 is a diagram showing a configuration parameter editing submenu of a deployment menu of a software deployment application according to an exemplary embodiment of the present invention. The configuration parameter editing submenu is generally referred to by the reference number 900. The configuration component editing submenu 900 may be selected when a deployment menu tab 902 is active.

The configuration parameter editing submenu 900 allows a user to modify configuration parameters for a particular deployment. FIG. 9 shows an example of current parameters that may be used for a deployment to servers and/or computer systems in a quality assurance (QA) environment and/or a production environment. Parameters may vary across different environments. For example, a deployment to the quality assurance environment may be done to different port numbers for a database component.

Figure 10:
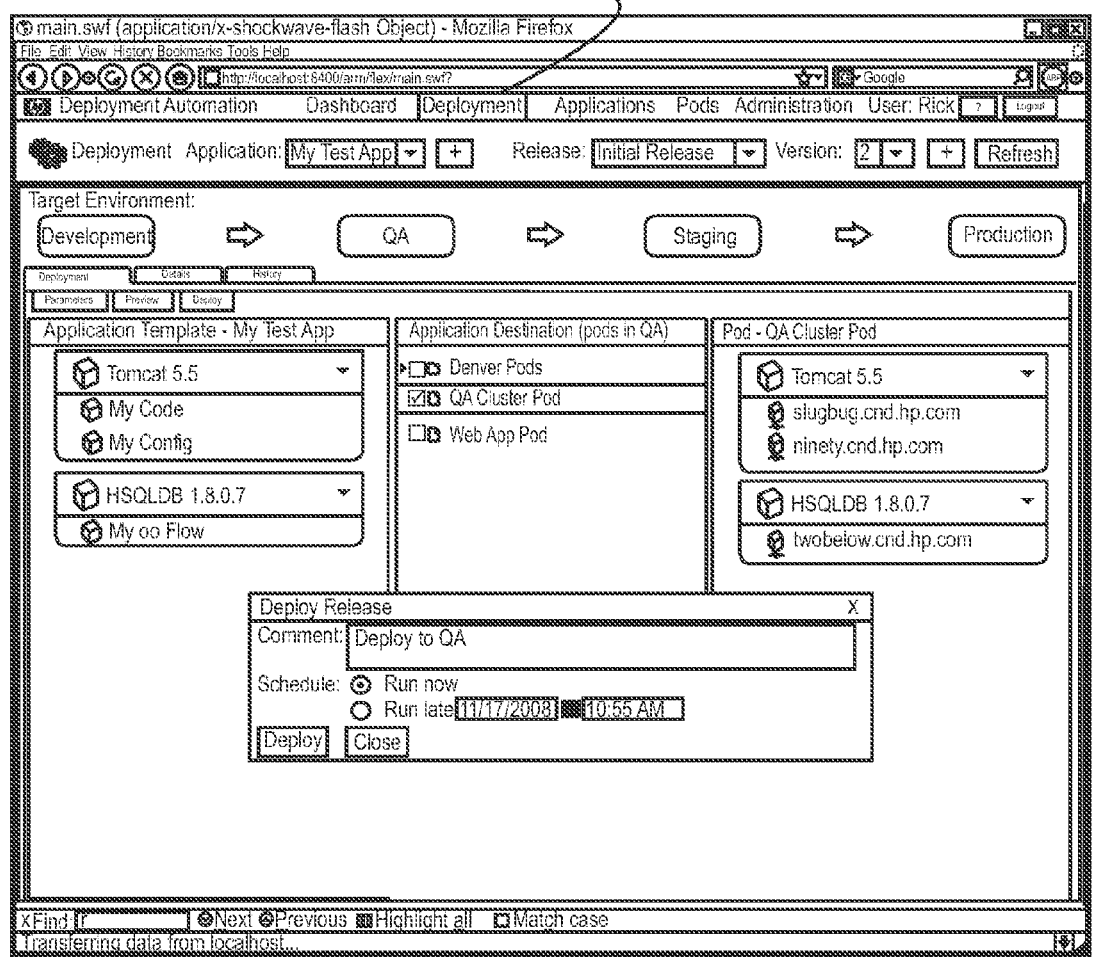
FIG. 10 is a diagram showing a release deployment submenu of a deployment menu of a software deployment application according to an exemplary embodiment of the present invention.

FIG. 10 is a diagram showing a release deployment submenu of a deployment menu of a software deployment application according to an exemplary embodiment of the present invention. The release deployment submenu is generally referred to by the reference number 1000. The release deployment submenu 1000 may be selected when a deployment menu tab 1002 is active. The release deployment submenu 1000 allows a user to select a pod for a software deployment and to initiate the deployment. The deployment may be performed in real time or may be scheduled for a future time.

Figure 11:
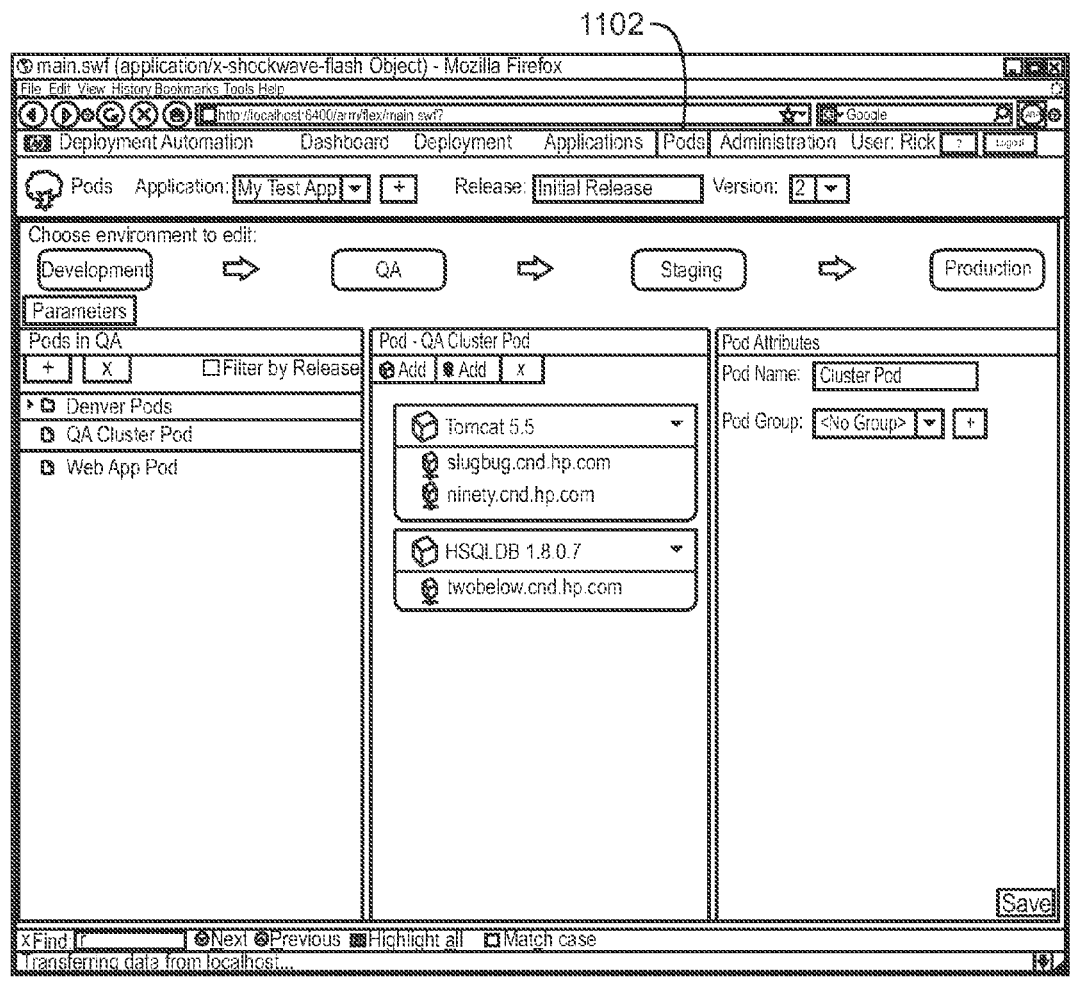
FIG. 11 is a diagram showing a pods menu of a software deployment application according to an exemplary embodiment of the present invention.

FIG. 11 is a diagram showing a pods menu of a software deployment application according to an exemplary embodiment of the present invention. The pods menu is generally referred to by the reference number 1100. The pods menu 1100 includes a pods menu tab 1102, which may be selected to display the pods menu 1100 of a software deployment tool according to an exemplary embodiment of the present invention. As shown in FIG. 9, the pods menu 1100 may be used to show the status of pods that are updated with software using a software deployment tool according to an exemplary embodiment of the present invention. As set forth above, pods contain tiers needed (or a superset thereof) for a particular version of a release of an application. The tiers in a pod are populated with target devices.

Figure 12:
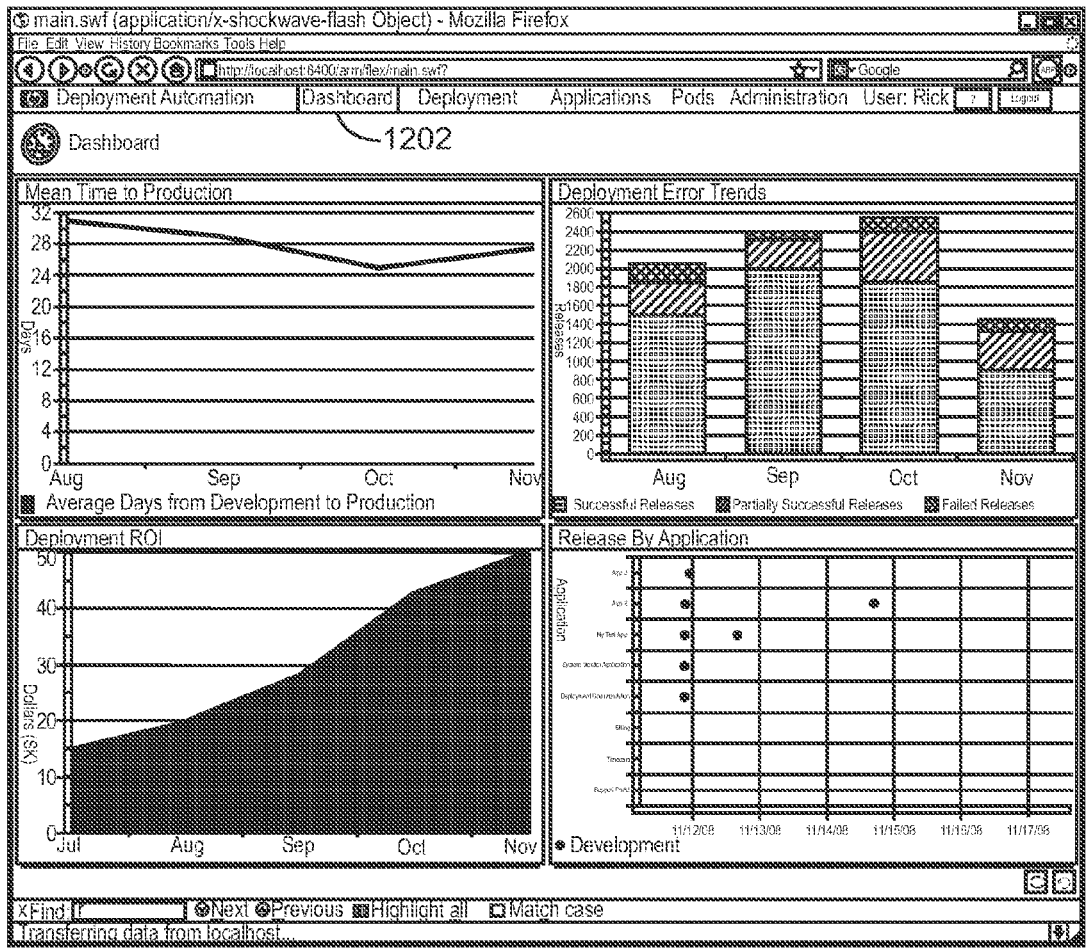
FIG. 12 is a diagram showing a dashboard menu of a software deployment application according to an exemplary embodiment of the present invention.

FIG. 12 is a diagram showing a dashboard menu of a software deployment application according to an exemplary embodiment of the present invention. The dashboard menu is generally referred to by the reference number 1200. The dashboard menu 1200 includes a dashboard menu tab 1202, which may be selected to display the dashboard menu 1200 of a software deployment tool according to an exemplary embodiment of the present invention. As shown in FIG. 2, the dashboard menu 1200 allows a user to get overall status information about a managed network of computer systems.

Figure 13:
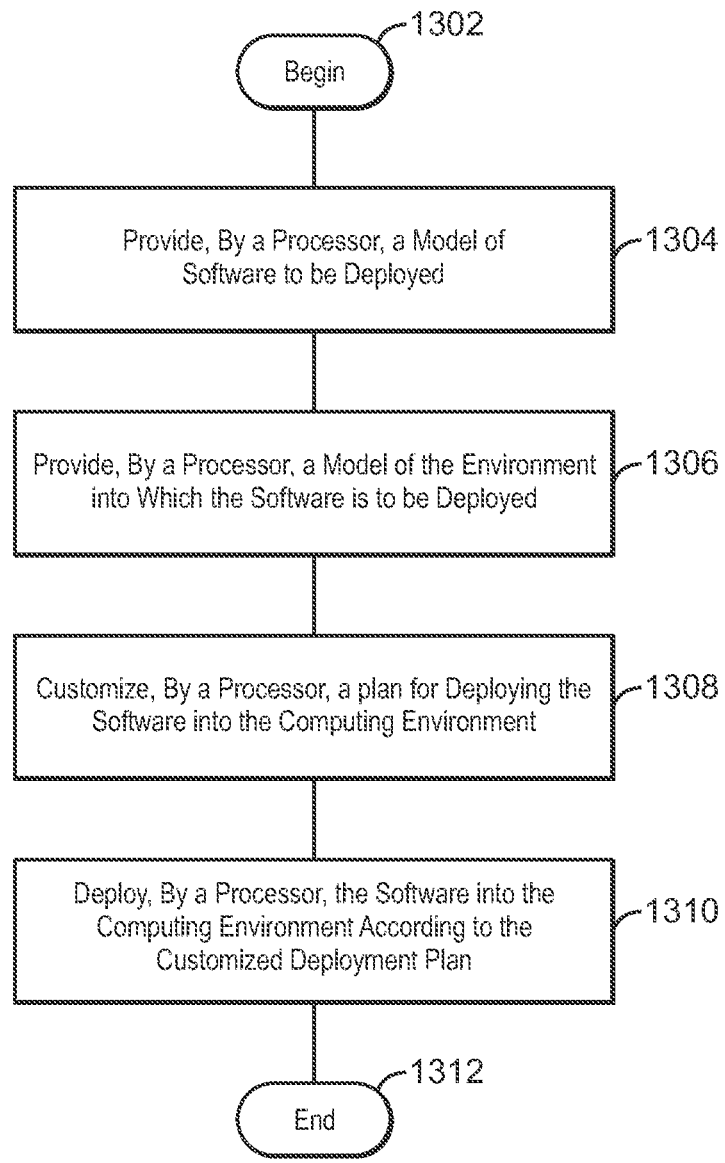
FIG. 13 is a process flow diagram showing a method of deploying software into a computing environment by a processor according to an exemplary embodiment of the present invention.

FIG. 13 is a process flow diagram showing a method of deploying software into a computing environment by a processor according to an exemplary embodiment of the present invention. The method is generally referred to by the reference number 1300. At block 1302, the method begins.

At block 1304, a model of software to be deployed is provided by a processor. The software may comprise an application, a patch, a bug fix or the like. A model of the environment into which the software is to be deployed is provided by a processor, as shown at block 1306.

At block 1308, a plan for deploying the software into the computing environment is customized by a processor. As set forth above, the customization process matches elements of the software to be deployed to characteristics of the computing environment or environments that is going to receive the software. The customization process may include modification of deployment parameter values, as set forth above.

At block 1310, the software is deployed into the computing environment by a processor according to the customized deployment plan. The deployment may be initiated manually under control of a network support person. Alternatively, the deployment may be scheduled to take place at a future time. At block 1312, the method ends.

Figure 14:
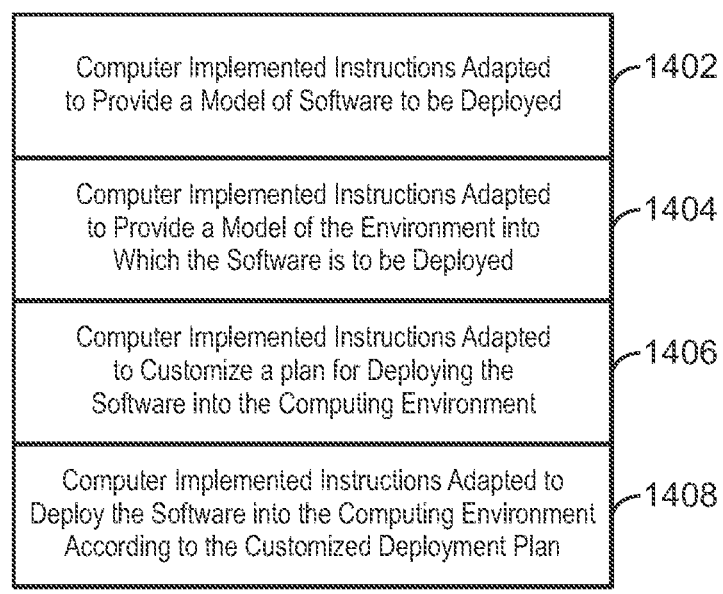
FIG. 14 Is a block diagram showing a tangible, machine-readable medium that stores computer-readable code adapted to perform software deployment according to an exemplary embodiment of the present invention.

FIG. 14 Is a block diagram showing a tangible, machine-readable medium that stores computer-readable code adapted to perform software deployment according to an exemplary embodiment of the present invention. The tangible, machine-readable medium is generally referred to by the reference number 1400. The tangible, machine-readable medium 1400 may correspond to any typical storage device that stores computer-implemented instructions, such as programming code or the like. Moreover, the tangible, machine-readable medium 1400 may comprise a volatile and/or non-volatile portion of the memory 104 (FIG. 1) of a computer the system such as the server 102 (FIG. 1). When read and executed by a processor such as the processor 106 (FIG. 1) of a typical computer system, the instructions stored on the tangible, machine-readable medium 1400 are adapted to cause the processor to perform a method of deploying software in accordance with an exemplary embodiment of the present invention.

A first region 1402 of the tangible, machine-readable medium 1400 stores computer-implemented instructions adapted to provide a model of software to be deployed. Computer-implemented instructions adapted to provide a model of the environment into which the software is to be deployed are stored on a second region 1404 of the tangible, machine-readable medium 1400.

A third region 1406 of the tangible, machine-readable medium 1400 stores computer-implemented instructions adapted to customize a plan for deploying the software into the computing environment. Computer-implemented instructions adapted to deploy the software into the computing environment according to the customized deployment plan are stored on a fourth region 1408 of the tangible, machine-readable medium 1400.

According to an exemplary embodiment of the present invention, software applications and modifications such as patches, bug fixes or the like may be deployed on a per tier basis using via the administration screen of a software deployment application.

An exemplary embodiment of the present invention addresses security concerns by allowing operations personnel to make logical entities (pods) available to resource consumers without exposing the actual target device name, IP address, user logons or passwords. Software application developers can create, organize and enhance their applications without prior knowledge of the operating environment into which they will be deployed. This provides for a consistent method of deployment across multiple operating environments in the software development lifecycle. Moreover, a method according to an exemplary embodiment of the present invention allows application definitions to be created in one set of products and reused across multiple automation products.

What is claimed is:

1. A method of deploying software into a computing environment, the method performed by instructions executed on a processor coupled to a computer readable memory containing the instructions, the method comprising:
    providing a model of the computing environment into which the software is to be deployed;
    customizing a plan that includes matching elements of the software to characteristics of the computing environment to deploy the software into the computing environment; and
    deploying the software into the computing environment according to the customized plan
    wherein the software is automatically deployed into the computing environment without a software developer collecting information about the computing environment.

2. The method of claim 1, wherein the computing environment comprises one or more pods each comprising one or more computer systems, and the software comprises a plurality of tiers.

3. The method of claim 2, further comprising preventing the deploying of the software into a given pod if the given pod does not contain the correct tiers for the software that is being deployed.

4. The method of 2, further comprising automatically determining whether a computer system within the computing environment is correctly configured to receive the software by evaluating whether an operating system and/or middleware on the computing system is correct relative to the software that is being deployed.

5. The method of claim 2, further comprising rolling back a deployment of the software if a problem in the deployment is encountered, the rolling back performed with a rollback mechanism that crosses multiple tiers of the software.

6. The method of claim 1, further comprising displaying an administration menu showing multiple parallel computing environments for deployment of the software including a first lifecycle environment and a second lifecycle environment.

7. A computer system comprising:
a processor; and
a memory device coupled to the processor and that stores machine-readable instructions that are executable on the processor to:
provide a model of the computing environment into which software is to be deployed, wherein the computing environment comprises one or more pods each comprising one or more computer systems, and the software comprises a plurality of tiers;
customize a plan for deploying the software into the computing environment, the plan matching elements of the software to characteristics of the computing environment; and
deploy the software into the computing environment according to the customized plan.

8. The computer system of claim 7, wherein the instructions are executable on the processor to further prevent deployment of the software into a given pod responsive to the given pod not containing the correct tiers for the software that is being deployed.

9. The computer system of claim 7, wherein the instructions are executable on the processor to further:
automatically determine whether computer systems within the computing environment are correctly configured to receive the software; and
evaluate whether an operating system and/or middleware on the computer systems is correct relative the software that is to be deployed.

10. The computer system of claim 7, wherein the instructions are executable on the processor to further implement a rollback mechanism that crosses multiple tiers of the software to roll back a deployment of the software if a problem in the deployment is encountered.

11. A computer system comprising:
a processor; and
a memory device coupled to the processor and that stores machine-readable instructions that are executable on the processor to:
provide a model of the computing environment into which software is to be deployed;
customize a plan for deploying the software into the computing environment, the plan matching elements of the software to characteristics of the computing environment, wherein the instructions to customize the plan include instructions to modify deployment parameter values; and
deploy the software into the computing environment according to the customized plan.

12. A non-transitory machine-readable medium comprising instructions executable on a processor to deploy software into a computing environment, the instructions executable on the processor to:
provide a model of the computing environment into which the software is to be deployed;
customize a plan for deploying the software into the computing environment, the plan matching elements of the software to characteristics of the computing environment;
deploy the software into the computing environment according to the customized plan; and
provide an administrative menu showing multiple parallel computing environments for deployment of the software including a first lifecycle environment and a second lifecycle environment.

13. The non-transitory machine-readable medium of claim 12, wherein the instructions are executable on the processor to provide a tier administration sub-menu to associate information that ensures appropriate operating system and middleware components are installed on each computing environment of the parallel computing environments prior to deployment of the software.

14. The non-transitory machine-readable medium of claim 12, wherein customizing the plan includes modifying deployment parameter values for each computing environment of the parallel computing environments.

15. The non-transitory machine-readable medium of claim 12, wherein the computing environment comprises one or more pods each comprising one or more computer systems, and the software comprises a plurality of tiers.

16. The non-transitory machine-readable medium of claim 15, wherein the instructions are executable on the processor to prevent deployment of the software on a given pod responsive to the given pod not containing the correct tiers for the software that is being deployed.

17. The non-transitory machine-readable medium of claim 15, wherein the instructions are executable on the processor to implement a rollback mechanism that crosses multiple tiers of the software to roll back a deployment of the software if a problem in the deployment is encountered.

* * * * *